United States Patent [19]

Danel

[11] 4,215,082
[45] Jul. 29, 1980

[54] DEVICE FOR INJECTING A GAS INTO A LIQUID

[75] Inventor: François Danel, Uriage, France

[73] Assignee: Societe Anonyme dete: Alsthom-Atlantique, France

[21] Appl. No.: 655,901

[22] Filed: Feb. 6, 1976

[30] Foreign Application Priority Data

Feb. 25, 1975 [FR] France .................. 75 05792
Dec. 22, 1975 [FR] France .................. 75 39259

[51] Int. Cl.² .................................................. B01F 3/04
[52] U.S. Cl. ...................... 261/124; 210/220; 210/242 A; 261/77; 261/120; 261/122; 261/123
[58] Field of Search .................. 261/122–124, 261/121 R, 120, 77; 239/145, 269, 450; 210/220, 242 A

[56] References Cited

U.S. PATENT DOCUMENTS

| | | | |
|---|---|---|---|
| 1,731,779 | 10/1929 | Houston | 261/122 |
| 1,867,143 | 7/1932 | Fohl | 261/124 X |
| 2,805,846 | 9/1957 | Dewan | 261/121 R |
| 3,186,644 | 6/1965 | Ross et al. | 261/124 X |
| 3,232,715 | 2/1966 | Indest | 261/123 X |
| 3,318,098 | 5/1967 | Hoddinott et al. | 261/124 X |
| 3,450,800 | 6/1969 | Smith et al. | 261/124 X |
| 3,587,972 | 6/1971 | Weeth | 239/450 X |
| 3,651,646 | 2/1972 | Grunau | 261/124 X |
| 3,672,571 | 6/1972 | Goodricke | 261/124 X |
| 3,677,936 | 7/1972 | Bastiaanse | 261/124 X |
| 3,696,929 | 10/1972 | Shah | 261/124 X |
| 3,799,442 | 3/1974 | Delmer | 239/145 |
| 3,880,965 | 4/1975 | Dudis et al. | 261/124 X |

FOREIGN PATENT DOCUMENTS

| | | | |
|---|---|---|---|
| 45-20350 | 10/1970 | Japan | 261/124 |
| 843131 | 8/1960 | United Kingdom | 261/124 |
| 953743 | 4/1964 | United Kingdom | 261/124 |

Primary Examiner—Richard L. Chiesa
Attorney, Agent, or Firm—John J. Hart

[57] ABSTRACT

Device for the injection of a gas in a liquid, constituted by a gas feed tube in which at least a part of the walls is immersed in the liquid at the place where the injecting of the said gas is to be effected, flexible pipes having a small inside diameter being connected up along the said walls, the gas escaping in the form of bubbles from their free ends in the liquid.

9 Claims, 10 Drawing Figures

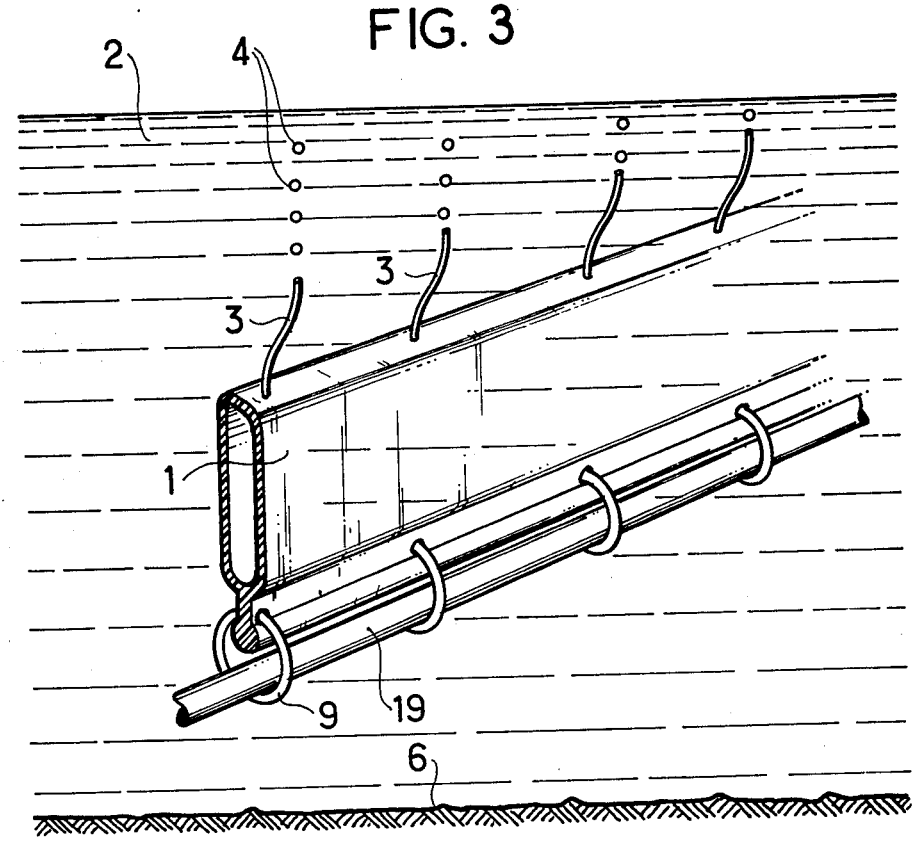
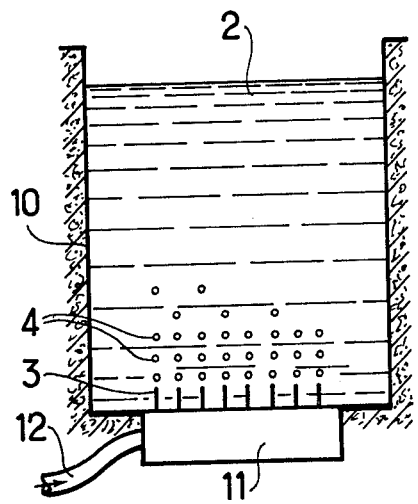
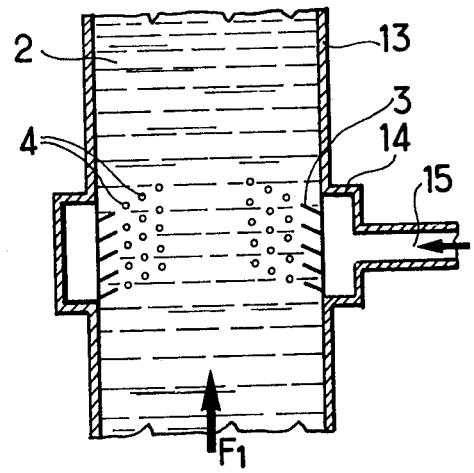

DEVICE FOR INJECTING A GAS INTO A LIQUID

In the branch of chemical engineering, circumstances often make it necessary to bring a liquid and a gas into close contact with each other.

There exist at present several types of devices, more particularly assemblies of perforated walls comprising holes through which the gas escapes towards the liquid, walls which are locally porous, or mechanical stirrers and mixers.

These devices operate well only at vacuum ratios (ratio between the volume of gas and the total volume of gas and liquid in the medium in question) which do not vary greatly and at low gas discharge rates.

Very poor distribution of the injection is observed at high discharge rates, that distribution then being effected in genuine streams of gas which form large gas pockets while reducing the specific contact surface. Moreover, mechanical devices have, on their part, a very poor energy efficiency.

The present invention has as its object a device enabling great evenness of injection of bubbles having the required diameter, applicable to numerous industrial methods, more particularly in the branch of fermenting, chemical reactions, the oxygenating of expanses of water with a view to fighting against pollution and to biological control of oxygen requirements. It is also possible, by means of that device, to effect the physical modifying of a medium and more particularly the modifying of its acoustic properties.

The device according to the invention is constituted by a gas supply device in which at least a part of the walls is immersed in the liquid at the place where the injecting of the said gas is to be effected, pipes having a small inside diameter, less than 2 mm and a length at least 20 times that of the said diameter, being connected up along the said walls, the gas escaping in the form of bubbles from their free ends in the liquid, those ends being such that they can have a slight movement imparted to them under the influence of the injecting of the gas in the liquid and of the currents caused by that injecting.

When the bubbles are formed, at the time of their giving off at the end of the pipe, the bubbles grow to reach a diameter slightly greater than that of the outside diameter of the pipe.

In those conditions, the choice of the inside diameter and of the outside diameter of the pipes is taken into consideration when determining the diameter of the bubbles given off.

Preferably, the pipes will have an inside diameter varying between 0.05 and 0.1 mm, an outside diameter in the order of 0.3 to 0.5 mm and a length of about 5 cm.

The choice of the location of the pipes makes it possible to obtain a good distribution in space and the injection discharge rate makes it possible to form the number of bubbles required.

It is possible, more particularly, to obtain very slight vacuum ratios, the device maintaining a great stability of injection at low discharge rates. The loss of head of the system being slight, its energy efficiency is particularly good. The movement of the free ends of the pipes, which occurs under the effect of the injecting of the gas, promotes the regular detachment of the bubbles and prevents the clogging and adhering of spurious particles. Moreover, the pipes can be made of a material comprising products called "anti-fouling" agents, that is, agents preventing the development of water weeds and micro-organisms, this being an advantage for the use of the device in a marine medium.

Numerous arrangements for the embodying of the device according to the invention can be contrived; more particularly, the pipes can be installed on the wall of a gas supply tube immersed horizontally to a determined depth, the cross-section of that tube possibly being flattened to enable storing thereof by winding and thus to make it easy to implement and transport the device. Fixing systems can be provided on that tube.

The gas supply tube can be formed by a chamber contiguous with the wall of an enclosure containing the liquid in which the injecting is required to be effected.

The device according to the invention can be constituted by an annular gas feed tube, comprising, on its inside wall, the gas injection pipes and inside which the liquid to be treated flows.

It is also possible to impart various shapes to the free end of the pipes, for example, an end which is elbow-shaped, which would cause movements of that end promoting the even detaching of the bubbles.

The gas injection pipes can be flexible. Rigid pipes can be accepted, on condition that they be provided with a flexible fixing device on the wall of the feed tube, so that in that case, as in the preceding case, the end be free to move slightly under the influence of the injecting of the gas, or of the currents produced by that injecting.

Variants of embodiment in which a current of liquid is produced at the place where the bubbles are given off, this having the effect of producing, on these latter, a drag which causes them to be detached before they reach the size which they would have in practically stagnant water, can be contrived.

It is thus possible to obtain bubbles which are very much smaller, which are an advantage for certain particular applications.

That current of liquid affects, moreover, the flexible pipe, causing the vibrating thereof, further promoting the detaching of the gas bubble.

Several embodiments of the device according to the invention are given herebelow by way of examples, with reference to the accompanying figures.

FIG. 3 is a perspective view of a variant of embodiment of the device.

FIG. 4 is a vertical cross-section view of a varient of embodiment of the device.

FIG. 5 is a vertical cross-section view of a variant of embodiment of the device.

Figure 1:
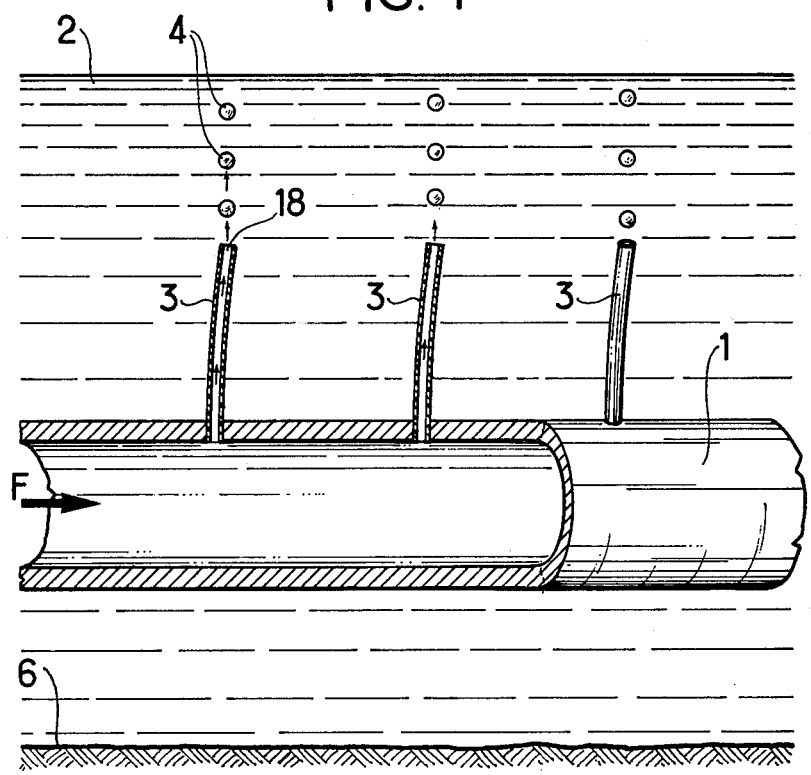
FIG. 1 is a diagrammatic view of a vertical cross-section of a gas injecting device.

FIG. 1 shows a gas supply tube immersed in an expanse of liquid 2 which is required to be brought into close contact with the said gas, that tube comprising, on its periphery, flexible pipes 3 having a small inside diameter, for example 0.05 mm, an outside diameter of 0.3 mm and a length of about 5 cm.

The gas arrives at a predetermined pressure in the tube 1 in the direction of the arrow 1 and escape in the liquid 2 by the ends 18 of the flexible pipes 3, those ends 18 having a slight movement imparted to them under the effect of that escaping of gas and of the currents which it produces in the liquid, that movement promoting, on the one hand, the giving off of gas in the form of bubbles 4 with the regular detaching of the bubbles and preventing, on the other hand, the clogging and adhering of spurious particles on the said ends.

The good distribution of the bubbles in space will be ensured by the choice of the location of the pipes 3, the diameter of the bubbles will be determined by the inside diameter of the pipes 3 and the number of bubbles will be controlled by the gas injection discharge rate.

Figure 2:
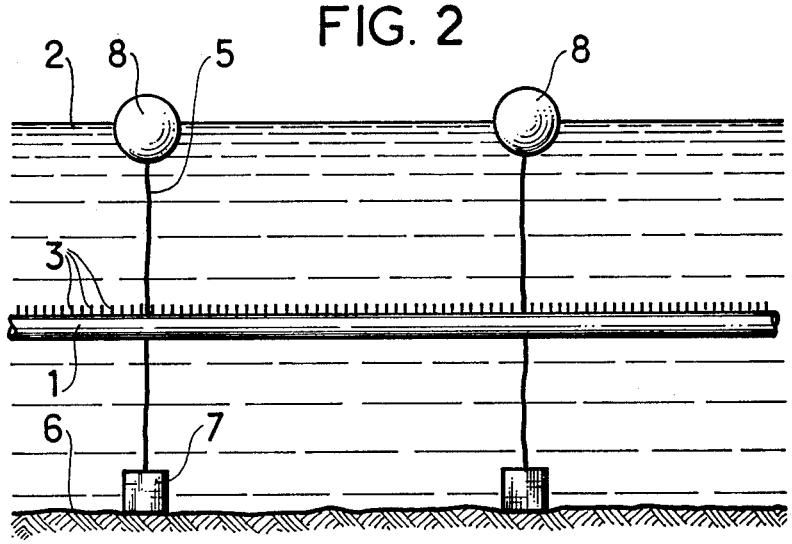
FIG. 2 is an elevation view of an injecting device in place in an expanse of water.

FIG. 2 shows an embodiment of the device for aerating a lake at a certain depth, according to which a rigid gas supply tube 1, with its injection pipes 3, is suspended at the required depth by means of cables 5 fixed to the bottom 6 by means of ballasting weights 7 and supported by means of floats 8.

FIG. 3 shows a variant of embodiment of the device in which the tube 1 is flexible and has a flattened cross-section so as to enable the unwinding thereof with a view to making the storing transporting and installing thereof easier.

Fixing rings 9 on a cable 19 can then be provided on the tube 1, that cable contingently being immersed to a determined depth or laid on the bottom 6.

FIG. 4 shows a variant in which the injecting of bubbles is effected in a liquid 2 contained in a tank 10, the gas supply tube being constituted by a chamber 11 contiguous with the bottom of the tank and comprising the flexible tubes 3 producing the giving off of bubbles 4 in the liquid 2 of the tank, the chamber 11 being supplied with gas at a predetermined pressure by a tube 12.

In the embodiment in FIG. 5, the liquid 2 flows in a pipe 13 in the direction of the arrow $F_1$ and the gas is brought to the flexible pipes 3 for giving off bubbles 4 by means of an annular chamber 14 supplied by means of a pipe 15.

Figure 6:
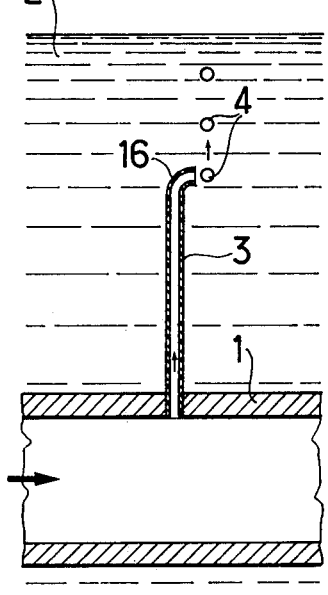
FIG. 6 is a vertical cross-section view of an embodiment of the gas injection pipes.

An elbow shape 16 such as shown in FIG. 6 could be imparted to the ends of the pipes 3, in order to cause movements of that end which are more accentuated under the effect of the giving off of the bubbles 4, in order to promote to the greatest possible extent the even detaching of the said bubbles.

Figure 7:
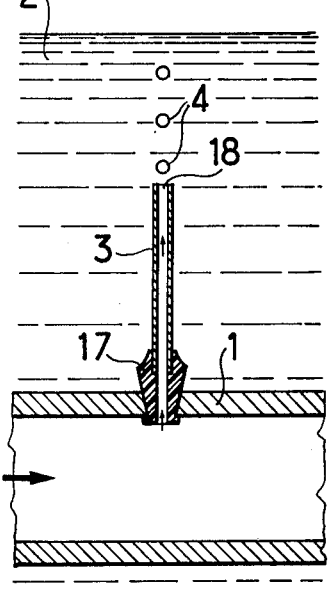
FIG. 7 is a vertical cross-section view of another embodient of the gas injection pipes.

FIG. 7 shows a variant in the embodiment of the pipes 3, in which these latter are rigid but are then incorporated in the wall of the tube 1 by means of a flexible element 17 enabling the free moving of their ends 18 under the effect of the giving off of the bubbles 4.

Figure 8:
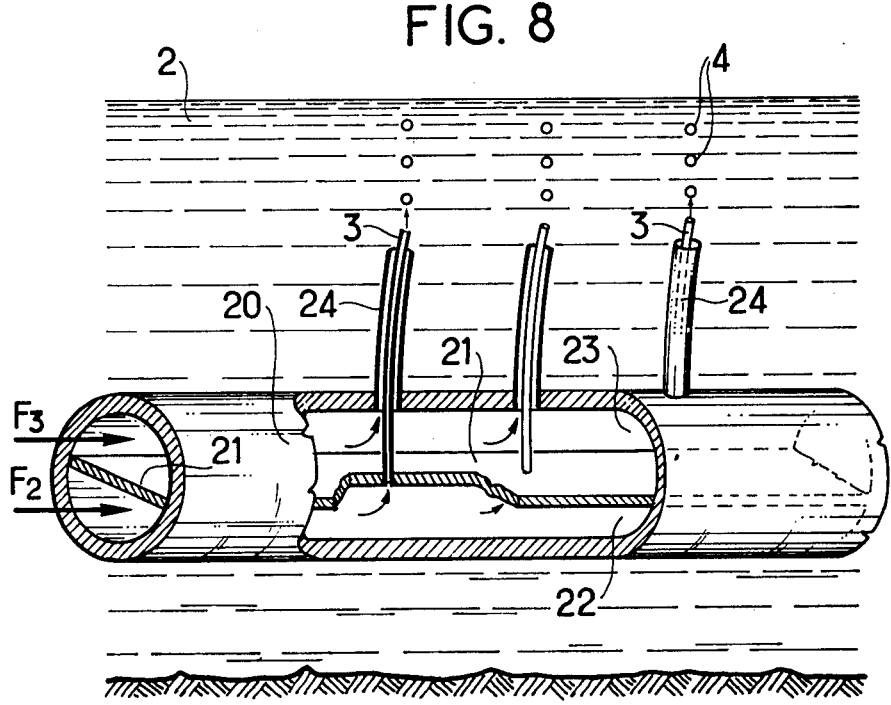
FIG. 8 is a diagrammatic view of a partial vertical cross-section of a gas injection device, a current of liquid affecting the bubbles.

FIG. 8 shows a tube (20) immersed in an extent of liquid (2) which is required to be brought into close contact with a gas.

That tube is divided into two parts by a diametrical wall (21), the gas under pressure arriving through the part (22), in the direction of the arrow $F_2$ and being injected in the expanse by the end of the flexible pipes (3); some liquid arriving under pressure in the part (23) of the tube in the direction of the arrow $F_3$ and being injected in the expanse of liquid by pipes (24) which are concentric with the flexible gas injection pipes (3) so as to produce an annular current along those tubes, affecting the end of these latter to create a thrust on the gas bubble (4) at the point where it is given off, causing the detaching thereof when it has a small size, so that very fine bubbles are obtained.

Figure 9:
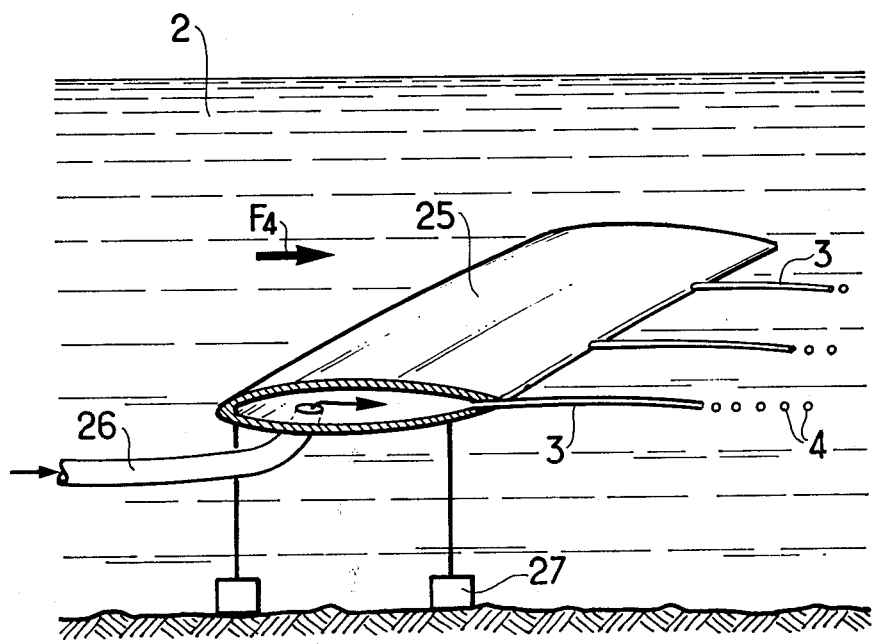
FIG. 9 is a perspective view of a vertical cross-section of a variant of embodiment of the device according to the invention.

That annular current of liquid along the flexible pipes (3) has the effect, moreover, of making them vibrate, further promoting the detaching of gas bubbles. FIG. 9 shows another variant in which the flexible gas exhaust pipes (3) are arranged on a gas supply tube (25) having a profiled shape, connected to a source for supplying gas under pressure by means of the flexible pipe (26), that assembly being placed in a current of water flowing in the direction of the arrow $F_4$, for example, in a river and being fixed by means of ballasting weights (27) or fixed in a tube.

Figure 10:
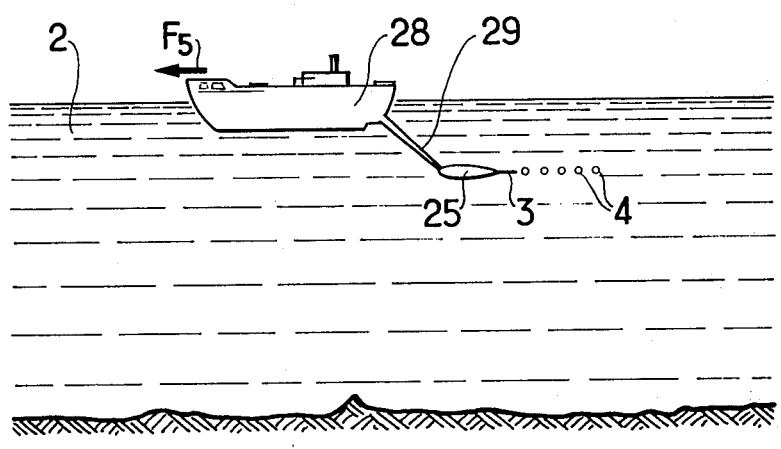
FIG. 10 is a view of a mobile gas injecting device.

In that case, the same detaching effect is produced on the bubbles (4) as previously under the action of the current of water along the flexible pipes (3). FIG. 10 shows a variant in which the device in FIG. 9 comprising the gas supply tube (25) and the flexible gas exhaust pipes (3) are fixed to the back of a boat (28) by means of arms (29) installed on slide rails so as to enable adjusting for depth. The said device is towed in calm water to produce the moving thereof, in the direction of the arrow $F_5$, the action for detaching the bubbles (4) under the effect of the movement of the flexible pipes in relation to the water being the same as previously.

I claim:

1. Apparatus for injecting a gas into a quantity of liquid to provide the treated liquid with a given quality, comprising means for supplying gas to the liquid at a predetermined pressure and having at the place where the injection of the gas is to be effected a wall portion provided with a plurality of holes, a plurality of pipes mounted at one end in the holes of said wall portion and having substantially the remainder of their lengths surrounded by liquid with the other free ends thereof submerged in the quantity of liquid, each of said pipes being thin-walled with a small inside diameter, less than 2 mm, and having a length at least 20 times that of said diameter, the pressure of the gas supplied to said pipes forming at the free ends of said pipes bubbles of a given size, and the flexibility of said submerged pipes being such that the gas supplied therethrough to form the bubbles on the free ends of said pipes imparts to each such free submerged pipe end a slight movement causing the detachment of such bubble from said free pipe end, the gas pressure and the pipe flexibility causing the bubbles to form and be detached regularly and preventing spurious particles adhering to such free ends of the pipes, whereby said pipes regularly and evenly bring the gas into close contact with the treated liquid in the form of discrete gas units of given size.

2. Apparatus as defined in claim 1, in which the free ends of the pipes are elbow-shaped to an extent to accentuate the movement of such ends under the effect of the forces created by the gas injection in forming the bubbles thereon and thereby to enhance the even detachment of the bubbles therefrom.

3. Apparatus as defined in claim 1, in which at least some of said pipes have an inside diameter between 0.05 and 0.1 mm, an outside diameter of from 0.3 to 0.5 mm. and a length of about 5 cm.

4. Device according to claim 1, characterized in that the gas supply device is constituted by a chamber a part of whose walls is immersed in the liquid.

5. Device according to claim 1, characterized in that the pipes are rigid and are installed on the walls of the supply device by means of an elastic element.

6. Device according to claim 1, characterized in that the gas supply device is flexible and comprises a flattened transversal cross-section, the pipes being fixed on a thin end of that cross-section, fixing devices being fixed to the other end.

7. Device according to claim 1, characterized in that the flexible pipes for giving off gas are surrounded by concentric pipes in which a current of liquid flows, causing the detaching of the bubbles.

8. Device according to claim 1, characterized in that the gas supply device comprising the flexible pipes for giving off gas has a profiled shape and in that it comprises means for being installed transversally in a current of liquid, the said device being arranged on the upstream side of the flow, the flexible pipes for giving off gas being arranged on the downstream side of the flow.

9. The device according to claim 1, characterized in that the gas supply device comprising the flexible pipes for giving off gas has a profiled shape and in that it comprises means for being moved transversally in an expanse of liquid, the said device being upstream in relation to the direction of movement, the flexible pipes being downstream.

* * * * *